(12) United States Patent
Ochoa et al.

(10) Patent No.: US 8,843,616 B2
(45) Date of Patent: Sep. 23, 2014

(54) PERSONAL CLOUD COMPUTING WITH SESSION MIGRATION

(75) Inventors: Claudio Julio Gabriel Ochoa, Villa Allende (AR); Matthew J Allum, London (GB); Stanley Mo, Portland, OR (US); Shannon R Schroeder, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 12/879,816

(22) Filed: Sep. 10, 2010

(65) Prior Publication Data

US 2012/0066373 A1 Mar. 15, 2012

(51) Int. Cl.
  *G06F 15/173* (2006.01)
  *G06F 9/48* (2006.01)
(52) U.S. Cl.
  CPC .................................... *G06F 9/4856* (2013.01)
  USPC ........... 709/224; 709/203; 709/213; 709/214; 709/216; 709/217; 709/219; 709/226
(58) Field of Classification Search
  USPC ......... 709/203, 213, 214, 216, 217, 219, 224, 709/226
  See application file for complete search history.

(56) References Cited

U.S. PATENT DOCUMENTS

| | | | |
|---|---|---|---|
| 2008/0082601 A1 | 4/2008 | Meijer et al. | |
| 2008/0276170 A1* | 11/2008 | Bonansea et al. | 715/708 |
| 2009/0063690 A1* | 3/2009 | Verthein et al. | 709/228 |
| 2010/0094996 A1* | 4/2010 | Samaha | 709/224 |
| 2010/0241507 A1* | 9/2010 | Quinn et al. | 705/14.42 |
| 2011/0276986 A1* | 11/2011 | Kamath et al. | 719/328 |

FOREIGN PATENT DOCUMENTS

| | | |
|---|---|---|
| JP | 2006-172440 | 6/2006 |
| KR | 1020060131739 A | 12/2006 |

OTHER PUBLICATIONS

International Search Report for PCT/US2011/049608, mailed Apr. 18, 2012, 2 pages.
Written Opinion for PCT/US2011/049608, mailed Apr. 18, 2012, 5 pages.
Varia, J., "Architecting for the Cloud: Best Practices," Amazon Web Services, Jan. 2010, Retrieved from http://boris.insert-coin.org/books/cloudbestpractices.pdf, 21 pages.
Zhang, X. et al., "Securing Elastic Applications on Mobile Devices for Cloud Computing," CCSW '09, Nov. 13, 2009, Retrieved from http://profsandhu.com/zhang/ccsw09-elastic.pdf, 8 pages.

(Continued)

*Primary Examiner* — Liangche A Wang
(74) *Attorney, Agent, or Firm* — Schwabe, Williamson & Wyatt, P.C.

(57) ABSTRACT

Methods and systems associated with personal cloud computing (PCC) are disclosed herewith. In embodiments, a method may include receiving, by a PCC client device, a message from a PCC server. The message may include information for migrating a session of an application executing on another PCC client device off the other client device. In response, an application may be launched, by the client device, to migrate the session onto the client device, using the information included in the message. In embodiments, a PCC server may be configured to receive a request from a PCC client device to migrate a session of an application executing on the client device off the client device; and in response, to send a message to another PCC client device equipped to launch an application on the other client device to migrate the session onto the other client device. The message may include information for the migration. Other embodiments are also disclosed and claimed.

25 Claims, 6 Drawing Sheets

(56) References Cited

OTHER PUBLICATIONS

Office Action mailed Jun. 25, 2013 for Japanese Application No. 2012-533395, 2 pages.

Office Action mailed Jun. 26, 2013 for Korean Application No. 10-2011-7031568, 5 pages.

Office Action mailed Oct. 29, 2013 for Japanese Application No. 2012-533395, 4 pages.

* cited by examiner

PERSONAL CLOUD COMPUTING WITH SESSION MIGRATION

TECHNICAL FIELD

Embodiments relate to the fields of data processing, in particular, to methods, apparatuses and articles associated with personal cloud computing with session migrating.

BACKGROUND

Unless otherwise indicated herein, the materials described in this section are not prior art to the claims in this application and are not admitted to be prior art by inclusion in this section.

In today's digital, interconnected environment, most users own several computing, communication, and/or entertainment devices. In most cases, under the current art, these devices operate as isolated entities, as it is often difficult or requires technical knowledge and/or skill to have the different devices seamlessly work together. In general, there is a lack of continuous experience for whatever activity the user is performing on or with the various devices.

For example, many users listen to music through their laptops, using their respective playlists built-up and/or associated with online music stores. Often times, they also own in-vehicle infotainment devices, with Internet enabled media players. However, under today's technology, these users are generally not able to enjoy a continuous experience when they move from their offices/homes into their vehicles or vice versa.

Similarly, many users often desire to switch Internet browsing from their desktops to their Smart Phones or vice versa. Again, under today's technology, the experience is often discontinuous.

BRIEF DESCRIPTION OF THE DRAWING

Embodiments of the present disclosure will be presented by way of exemplary embodiments, but not limitations, illustrated in the accompanying drawings in which like references denote similar elements, and in which.

DETAILED DESCRIPTION

Figure 1:
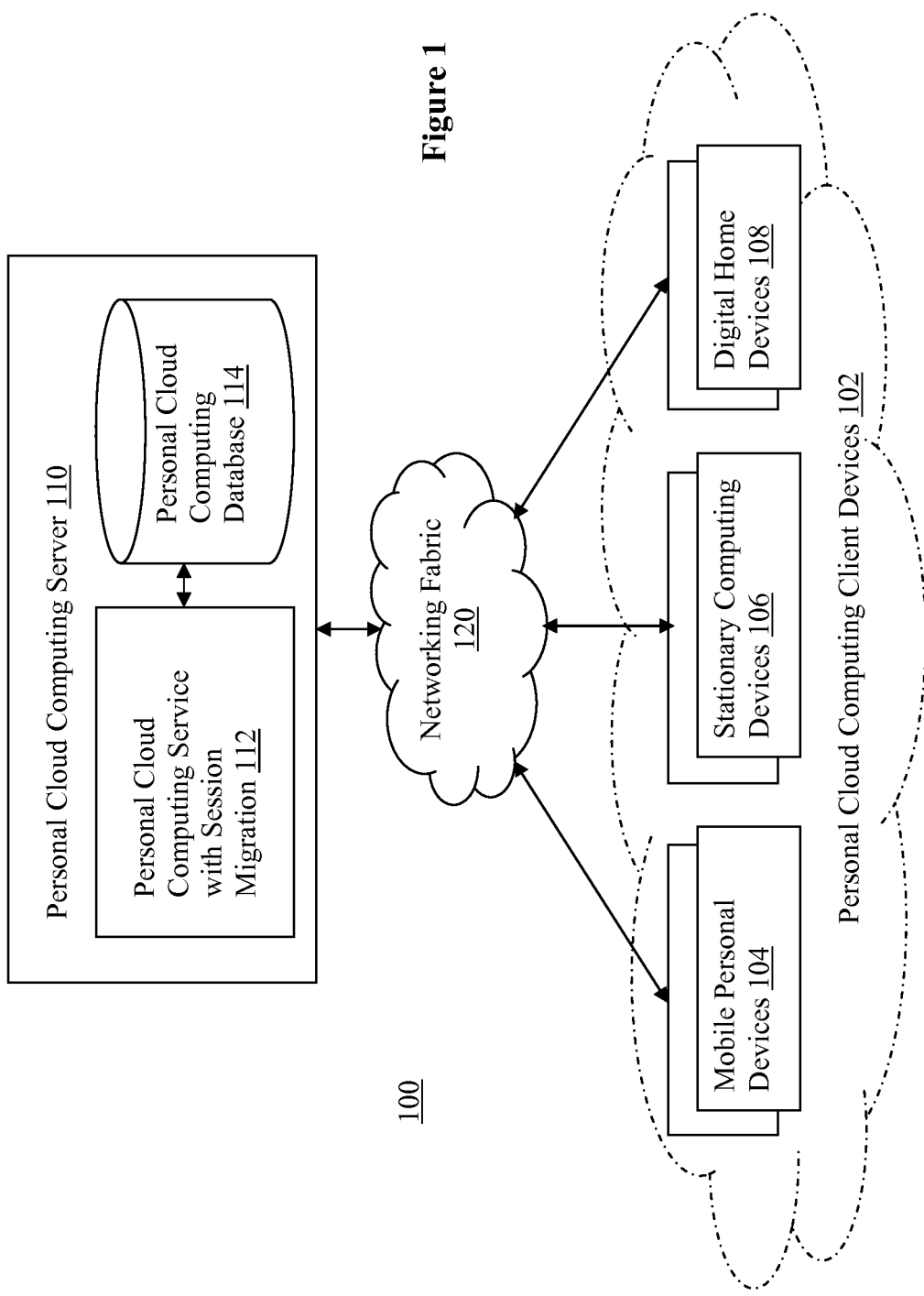
FIG. 1 illustrates an overview of a personal computing cloud with session migration.

Embodiments of methods and systems associated with personal cloud computing (PCC) with session migration are disclosed herewith. In embodiments, a method may include receiving, by a PCC Client Device (hereinafter, simply Client Device), a message from a PCC server (hereinafter, simply server). The message may include information for migrating a session of an application executing on another Client Device off the other Client Device. In response, an application may be launched, by the Client Device, to migrate the session onto the Client Device, using the information included in the message.

In various embodiments, receiving a message may include receiving, by the Client Device, a message from the server, wherein the message includes metadata of the application of the other Client Device, actions supported by the application of the other Client Device, data formats supported by the application of the other Client Device, a locator identifying resources used by the application of the other Client Device, or one or more parameter values to enable resumption of the session on the Client Device in a particular state. In various embodiments, launching an application may include launching an application, by the Client Device, that supports the actions supported by the application of the other Client Device, or the data formats supported by the application of the other Client Device.

In various embodiments, the method may further comprise determining, by the Client Device, an application on the Client Device that supports the actions supported by the application of the other Client Device, or the data formats supported by the application of the other Client Device. In various embodiments, the method may further include registering, by the Client Device, an application of the Client Device, with the server, including registering metadata of the application being registered, actions supported by the application being registered, or data formats supported by the application being registered. In various embodiments, the method may further include registering, by the Client Device, the Client Device, with the server. In various embodiments, the method may further include, receiving, by the Client Device, from the server, statuses of applications of other Client Devices of the personal computing cloud; and displaying, by the Client Device, the statuses.

In various embodiments, a Client Device with a networking interface, a processor and storage medium, may be provided with programming instructions configured to cause the Client Device to perform the above described methods, in response to execution of the instructions by the Client Device.

In various embodiments, a server may be configured to receive a request from a Client Device to migrate a session of an application executing on the Client Device off the Client Device; and in response, to send a message to another Client Device equipped to launch an application on the other Client Device to migrate the session onto the other Client Device. The message may include information for the migration.

In various embodiments, an article of manufacture with storage medium may include programming instructions stored therein configured to program a server to perform the above described server methods, in response to execution of the programming instructions by the server.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIG. 1 illustrates an overview of a personal computing cloud with session migration, in accordance with embodiments of the present disclosure. As illustrated, personal cloud computing (PCC) environment 100 includes a number of PCC Client Devices (hereinafter, simply Client Device) 102, coupled with PCC server (hereinafter, simply Server) 110, via networking fabric 120. Client Devices 102 may include one or more mobile personal devices 104, stationary computing devices 106 and/or digital home devices 108. Server 110 may include PCC service with session migration (hereinafter, simply Service) 112 and PCC database (hereinafter, simply Database) 114.

Client Devices 102, except for the teachings of the present disclosure, are intended to represent a broad range of these devices known in the art. Examples of mobile personal devices 104 may include, but are not limited to, smart phones (also sometimes simply referred to as mobile phones, as the functionalities of mobile phones continue to improve), mobile internet devices, personal digital assistants, portable media players, laptop computers, tablet computers, electronic book readers, portable game players, digital cameras, and so forth. Stationary computing devices 106 may include, but are not limited to, various desktop computers and in-vehicle infotainment devices. Digital home devices 108 may include, but are not limited to, digital communication enabled televisions, digital video recorders, and other digital home appliances.

Server 110, except for the teachings of the present disclosure, is intended to represent a broad range of server devices known in the art. Server 110 may be a single server or a cluster of servers locally and/or remotely coupled via direct coupling, local area networks and/or wide area networks. The couplings may be wired and/or wireless.

Networking fabric 120 is intended to represent a broad range of private and/or public local and/or wide area networks known in the art. The networks may be wired or wireless. A portion or the entire networking fabric may be local area network and/or wide area network.

As will be described in more details below, with references to FIGS. 2-8, by virtue of the teachings of the present disclosure, application session on one Client Device 102 may be seamlessly migrated to another Client Device 102. As a result, users of Client Device 102 may enjoy a continuous experience, otherwise not available under current technology. FIG. 7 illustrates an example migration of a video session from a digital home device (television) 652 to a laptop computer 654.

Figures 2, 3, 4:
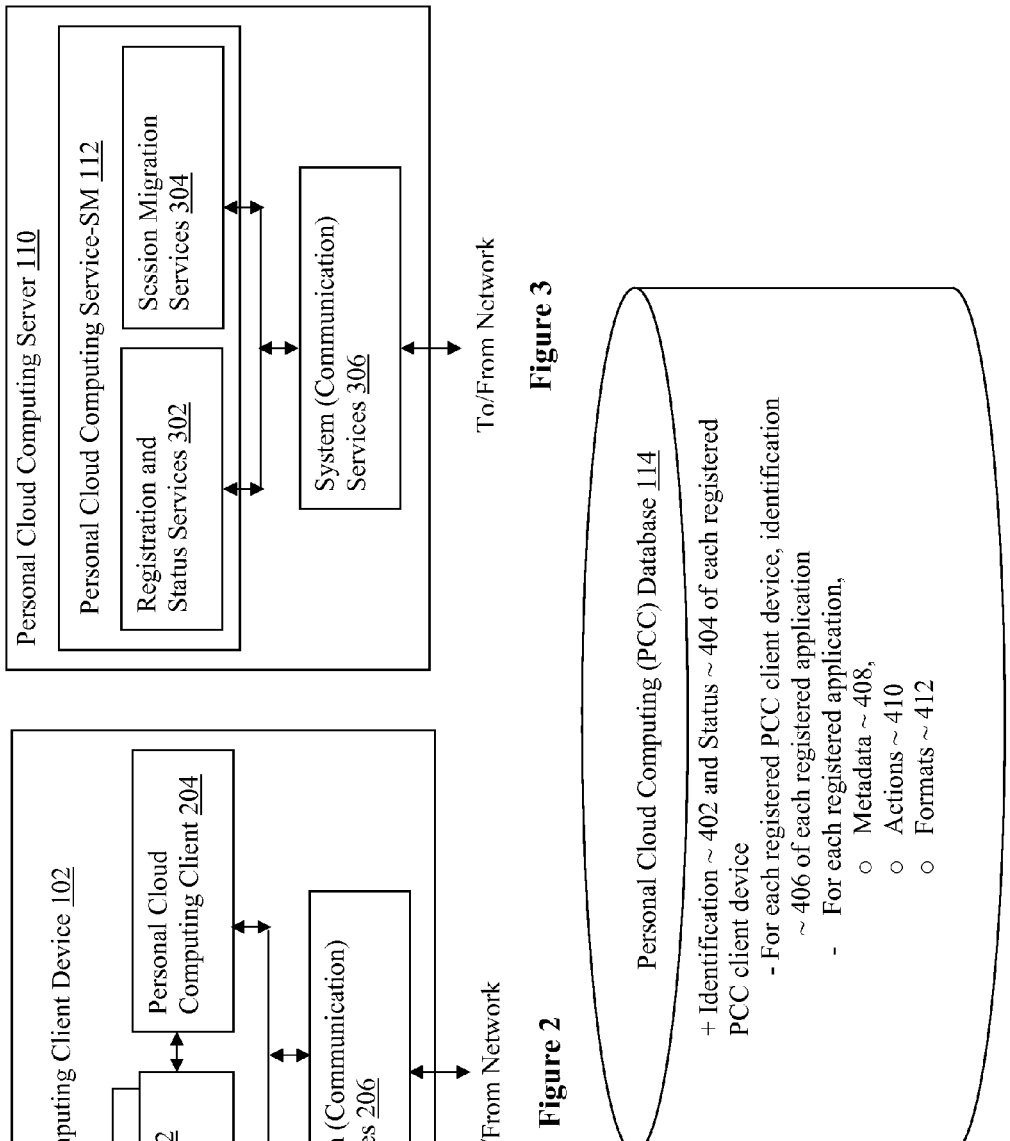
FIG. 2 illustrates one of the personal cloud computing Client Devices of FIG. 1 in further details.
FIG. 3 illustrates the personal cloud computing server of FIG. 1 in further details.
FIG. 4 illustrates the personal cloud computing database of FIG. 1 in further details.

Referring now to FIG. 2, wherein a Client Device 102 of FIG. 1 is illustrated in further details, in accordance with various embodiments of the present disclosure. As shown, for the illustrated embodiments, Client Device 102 may include one or more applications 202, a personal cloud computing client (hereinafter, simply Client) 204 and various system (communication) services 206, operatively coupled to each other. Applications 202, except for the teachings of present disclosure, are intended to represent a broad range of applications known in the art. Examples of applications 202, may include, but are not limited to, video, audio, internet browsing and/or gameplay applications. Beside their primary functions, that is, video rendering, audio rendering, gameplay, and so forth, applications 202 may be additionally configured to register themselves with Client 204. In particular, applications 202 may be additionally configured to register their metadata, actions and/or data/file formats supported.

For example, a video application may register its metadata, the fact that it supports the actions of "play," "pause," "stop" and "seek," and video data/file formats of ogv (promulgated by the Xiph.Org Foundation), avi (Audio Video Interleaved introduced by Microsoft Corp.), mpg (promulgated by Moving Picture Experts Group), and/or wmv (Window Media Video developed by Microsoft Corp.), or an audio application may register its metadata, the fact that it supports similar actions, as well as audio data/file formats of ogg (promulgated by the Xiph.Org Foundation), mps (promulgated by Moving Picture Experts Group), wma (Window Media Audio developed by Microsoft Corp.), acc (Advanced Audio Coding, standardized by International Organization for Standardization), and/or way (Waveform Audio File Format, developed by Microsoft Corp.). Similarly, a multimedia player may register its metadata, and the fact that it supports the actions of "open" and "book marking," and data/file formats of m3u (developed by Nullsoft), asx (Advanced Stream Redirector by Microsoft Corp), xspf (XMF Shareable Playlist Format, sponsored by Xiph.Org Foundation), wpl (Windows Media Player Playlist, developed by Microsoft Corp.), and/or pls (Playlist format), whereas an e-book application may register its metadata, the fact that it supports similar actions, and data/file formats of txt (Text File Format), azw (a Kindle eBook File Format), opf (Open Packaging File Format), tr3 (TomeRaider eBook File Format), xml (Extensible Markup Language, produced by W3C), chm (Compiled HTML File Format), or pdf (Portable Document Format by Adobe Systems).

In various embodiments, Client 204 may be configured to register Client Device and its applications 202, including the applications' metadata, actions and/or data/file formats supported, with service 112 of server 110. Further, Client 204 may be configured to report the status of applications 202 to service 112, receive status of other applications 202 on other Client Device 102, as well as to display status of its own and other applications 202. In various embodiments, Client 204 is configured to be conversant in Extensible Messaging and Presence Protocol (XMPP). System (communication) services 206 may be configured to provide various conventional system, in particular, communication services for applications 202 and Client 204. Services 206 may include resource (such as processor, memory and storage) allocations, and/or network communications with external devices, such as server 110.

Referring now to FIG. 3, wherein Server 110 of FIG. 1 is illustrated in further details, in accordance with various embodiments of the present disclosure. As shown, for the illustrated embodiments, Server 110 may include service 112 and system (communication) services 306, operatively coupled to each other. Service 112 may include registration and status services 302 and session migration services 304. In various embodiments, registration and status services 302 may be configured to cooperate with Client 204 of Client Device 102 to register the respective applications 202. Further, registration and status services 302 may be configured to cooperate with the various Clients 204 to enable the various Clients 204 to be aware of, and able to respectively display the status of selected ones or all applications 202. Session migration services 304 may be configured to enable the seamless migration of application sessions from one Client Device 102 to another Client Device 102. System (communication) services 306, similar to system (communication) services 206, may be configured to provide various conventional system services, in particular, communication services for registration and status service 302 and session migration service 304. Services 306 may include resource (such as processor, memory and storage) allocations, and/or network communications with external devices, such as Client Device 102. In various embodiments, both registration and status services 302 and session migration services 304 are configured to support Extensible Messaging and Presence Protocol (XMPP).

Referring now to FIG. 4, wherein Database 114 of FIG. 1 is illustrated in further details, in accordance with various embodiments of the present disclosure. As shown, for the illustrated embodiments, Database 114 may include various data structures (not shown), e.g., tables to store the identification of the registered Client Device 102, their applications 202, and the associated information of applications 202. In various embodiments, the data structures may be configured to store identification 402 and status 404 of each registered Client Device 102. Further, for each registered Client Device 102, identification 406 of each registered application 202 may be stored. Additionally, for each registered application, metadata 408, supported actions 410, and supported data/file format 412 may also be stored.

Figure 5:
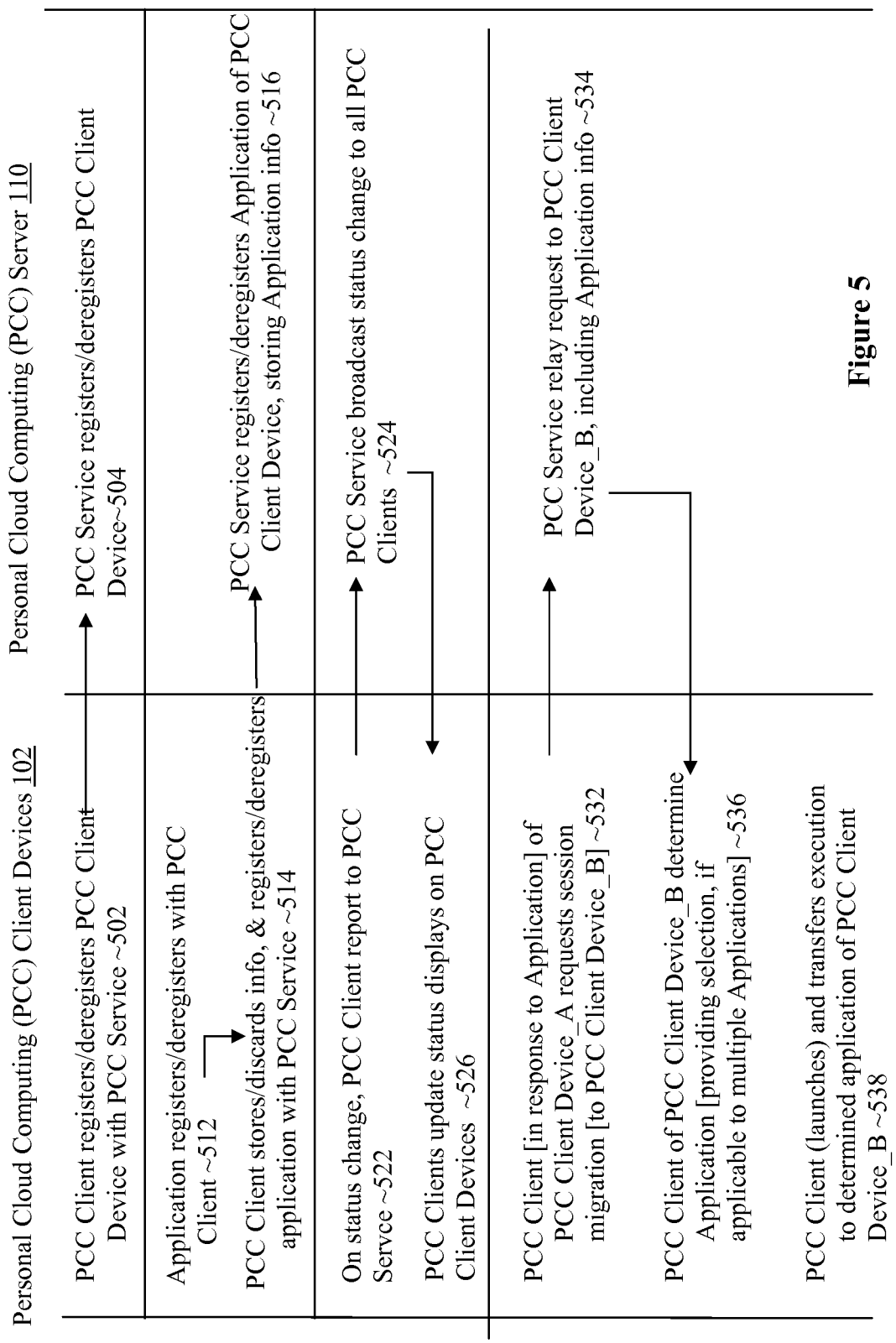
FIG. 5 illustrates various personal cloud computing processes.

Referring now to FIG. 5, wherein various PCC processes, in accordance with various embodiments of the present disclosure, are illustrated. As shown, the processes may include a process wherein a client 204 of a Client Device 102 may register or deregister the Client Device 102 with service 112, 502. In response, registration and status services 302 of service 112 may register or de-register the Client Device 102 accordingly, 504.

Additionally, the processes may include a process wherein an application 202 of a Client Device 102 may register or deregister itself with client 204 of the Client Device 102, 512. In response, client 204 of the Client Device 102 may store or discard the identification of the application, and associated information, as well as register or deregister the application and the associated information with service 112, 514. Similarly, in response, registration and status services 302 of service 112 may register or de-register the applications 202 of Client Device 102 accordingly, 516.

Continuing to refer to FIG. 5, the processes may include a process wherein on status change of an application 202 of a Client Device 102 or the Client Device 102 itself (e.g., online, idle, and so forth), the client 204 of the Client Device 102 may report the status change to registration and status service 302, 522. In response, registration and status service 302, may broadcast the new status information to the other Client Device 102, and update the status it maintains, 524. On receipt of new status of one of its own application 202 or an application 202 of another Client Device 102, client 204 may update a local status display of the various Client Device 102, 526.

Figure 6:
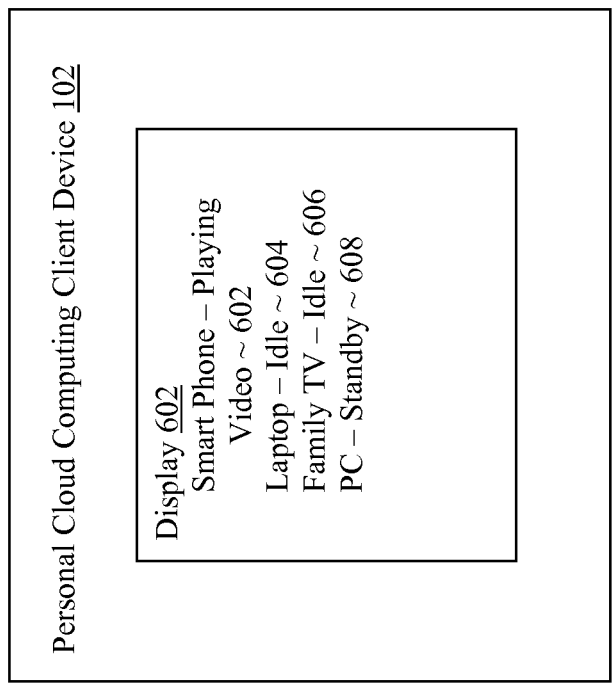
FIG. 6 illustrate an example personal cloud computing display.
Figure 7:
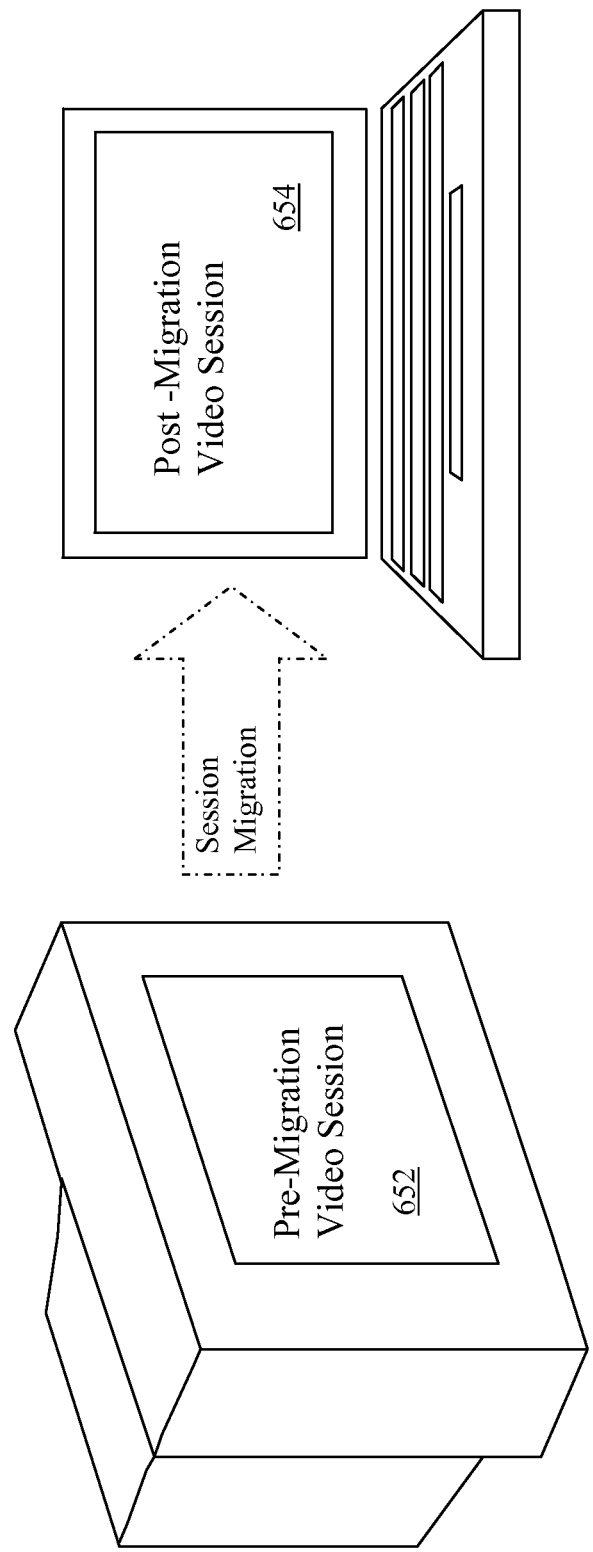
FIG. 7 illustrate an example session migration.

An example status display is shown in FIG. 6. Accordingly, a user of Client Device 102 of the present disclosure, may be able to discern the status of all the Client Devices 102 within his/her personal computing cloud with session migration 100.

Referring back to FIG. 5, the processes may include a process wherein client 204 of a Client Device 102 (e.g., Client Device_A) may request session migration services 304 to migrate a session of one its applications to another Client Device (e.g., Client Device_B) 102, 532. In various embodiments, Client 204 may offer the function that enables a user to make such a request. For these embodiments, Client 204 may initiate the request in response to receipt of a user request. In other embodiments, applications 202 may offer the function that enables a user to make such a request. For these embodiments, Client 204 may initiate the request in response to receipt of the user request through an application 202. In either case, the session migration request may be sent to service 112 in the form of a message. The message may include the metadata of the application, the supported actions and data/file format of the application. Additionally, the message may include a locator (e.g., an Uniform Resource Locator, identifying the location of the data used by the application session, and/or the parameter values for a successor application of the session to re-launch the session in a particular state.

In various embodiments, the Client Device_B 102 may be determined/selected by session migration services 304, based on the provided information in the message, e.g., metadata of the application, actions and data/file format supported and so forth. In other embodiments, the specification of Client Device_B 102 may be provided to session migration services 304. On receipt or determination of the target Client Device_B 102, session migration services 304 may inform (534) client 204 of Client Device_B 102 of the metadata of the application, which session is being migrated, the application's supported actions and/or data/file formats. In various embodiments, session migration services 304 may further inform client 202 of Client Device_B 102, of the location of the resource associated with the session, and parameter values for re-starting the session at a particular state.

In various embodiments, on receipt of the migration information (metadata et al), Client 204 of a Client Device 102, determines which registered application 202 of the Client Device 102 is the appropriate successor application for the session, 536. In various embodiments, if multiple applications 202 are eligible, Client 204 may offer a menu of the eligible applications for a user to select (not shown). In any event, on determination or selection of the successor application, if not launched already, Client 204 may launch the successor application, and transfer execution to the successor application, 538, thereby enabling seamless migration of a session from one Client Device of a personal computing cloud to another Client Device of the personal computing cloud.

Figure 8:
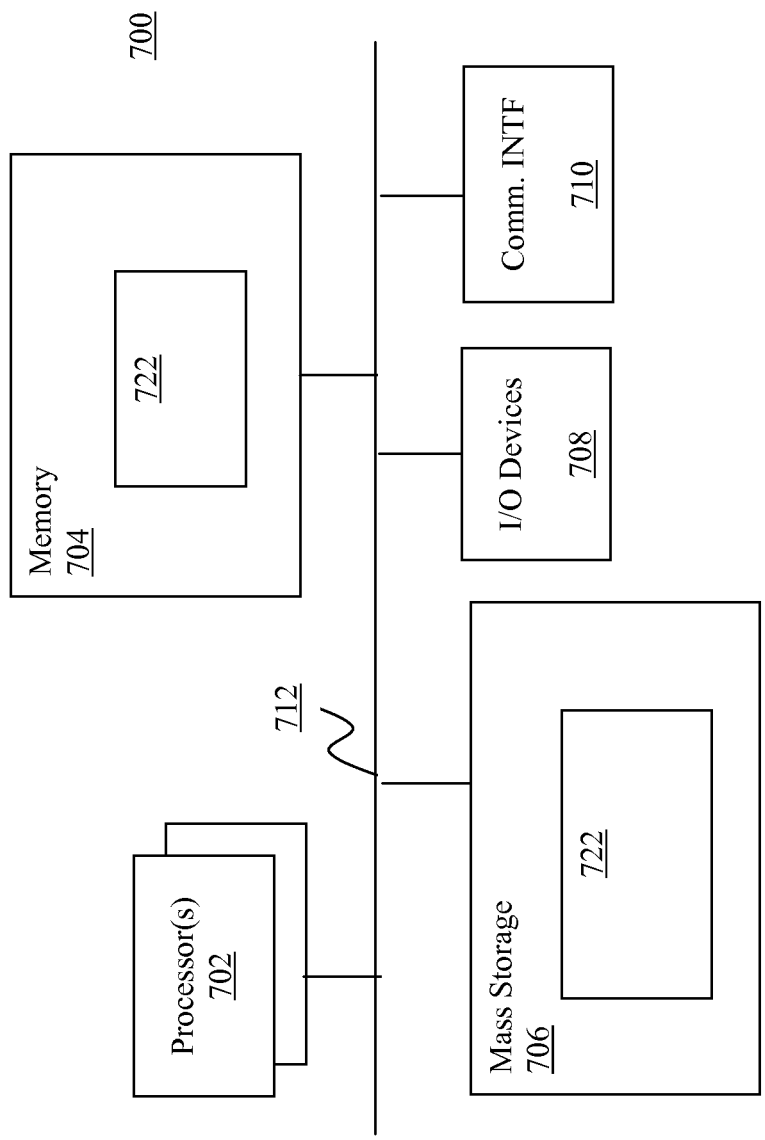
FIG. 8 illustrates an example computer system suitable for use to practice various Client Device and/or server aspects of personal cloud computing, where all of the foregoing illustrations are arranged in accordance with embodiments of the present disclosure.

FIG. 8 illustrates an example computer system suitable for use to practice Client Device and/or server aspects of various embodiments of the present disclosure. As shown, computing system 700 includes a number of processors or processor cores 702, and system memory 704. For the purpose of this application, including the claims, the terms "processor" and "processor cores" may be considered synonymous, unless the context clearly requires otherwise. Additionally, computing system 700 includes mass storage devices 706 (such as diskette, hard drive, compact disc read only memory (CDROM) and so forth), input/output devices 708 (such as display, keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown).

Each of these elements performs its conventional functions known in the art. In particular, system memory 704 and mass storage 706 may be employed to store a working copy and a permanent copy of the programming instructions implementing the various components, such as client 204, registration and status service 302, or session migration service 304, herein collectively denoted as 722. The various components may be implemented by assembler instructions supported by processor(s) 702 or high-level languages, such as, for example, C, that can be compiled into such instructions.

The permanent copy of the programming instructions may be placed into permanent storage 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The constitution of these elements 702-712 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method for personal cloud computing, comprising:
   receiving, by a second client device of a personal computing cloud, a message from a server associated with the personal computing cloud, wherein the message includes information for migrating a first session of a first application executing on a first client device of the personal computing cloud off the first client device, the first and second client devices being different client devices; and
   in response to receiving the message, launching a second application, by the second client device, to execute on the second client device, to succeed the first application, to migrate the first session of the first application onto a second session of the second application on the second client device, using the information included in the message, the first and second applications being different applications.

2. The method of claim 1, wherein receiving a message comprises receiving, by the second client device, a message from the server, wherein the message includes metadata of the first application of the first client device, first actions supported by the first application of the first client device, first data formats supported by the first application of the first client device, a first locator identifying first resources used by the first application of the first client device, or first one or more parameter values of a first state of the first session of the first application on the first client device.

3. The method of claim 2, wherein launching a second application comprises launching a second application, by the second client device, that supports the first actions supported by the first application of the first client device, or the first data formats supported by the first application of the first client device.

4. The method of claim 1, further comprising determining, by the second client device, that the second application on the second client device supports the first actions supported by the first application of the first client device, or the first data formats supported by the first application of the first client device.

5. The method of claim 1, further comprising registering, by the second client device, the second application of the second client device, with the server, including registering metadata of the second application, second actions supported by the second application, or second data formats supported by the second application.

6. The method of claim 1, further comprising registering, by the second client device, the second client device, with the server.

7. The method of claim 1, further comprising
   receiving, by the second client device, from the server, a first status of the first application on the first client device; and
   displaying, by the second client device, the first status of the first application on the first client device.

8. A second client device of a personal computing, comprising:
   a networking interface configured to couple the second client device to a network;
   a processor coupled with the networking interface, and configured to execute instructions; and
   a storage medium coupled with the processor, and having stored therein a plurality of programming instructions configured to program the second client device, to enable the second client device, in response to execution of the programming instructions, to:
   receive a message from a server associated with the personal computing cloud, wherein the message includes information for migrating a first session of a first application executing on a first client device of the personal computing cloud off the first client device, and onto the second client device; and
   in response to receipt of the message, launch a second application to execute on the second client device, to succeed the first application on the first client device, to migrate the first session of the first application from the first client device onto a second session of the second application of the second client device, using the information included in the message, wherein the first and second applications are different applications.

9. The client device of claim 8, wherein to receive a message comprises to receive a message from the server, with metadata of the first application of the first client device, first actions supported by the first application of the first client device, first data formats supported by the first application of the first client device, a first locator identifying first resources used by the first application of the first client device, or first one or more parameter values of a first state of the first session on the first client device.

10. The second client device of claim 9, wherein to launch a second application comprises to launch a second application that supports the first actions supported by the first application of the first client device, or the first data formats supported by the first application of the first client device.

11. The second client device of claim 9, wherein the programming instructions further enable the second client device, in response to execution of the programming instructions, to determine that the second application on the second client device supports the first actions supported by the first application of the first client device, or the first data formats supported by the first application of the first client device.

12. The second client device of claim 9, wherein the programming instructions further enable the second client device, in response to execution of the programming instructions, to register the second application of the second client device, with the personal cloud computing server, including registration of metadata of the second application, second actions supported by the second application, or second data formats supported by the second application, wherein the second actions and the second data formats respectively include the first actions and the first data formats.

13. The second client device of claim 9, wherein the programming instructions further enable the second client device, in response to execution of the programming instructions, to register the second client device, with the personal cloud computing server.

14. The second client device of claim 9, wherein the programming instructions further enable the second client device, in response to execution of the programming instructions, to
receive from the personal cloud computing server, the first status of the first application of the first client device of the personal computing cloud; and
display the first status.

15. The second client device of claim 9 wherein the second client device comprises a selected one of a mobile personal device, a stationary computing device, or a digital home device.

16. At least one non-transitory computer-readable storage medium comprising programming instructions stored in the storage medium, and configured to program an apparatus, to cause the apparatus, in response to execution of the instructions by the apparatus, to perform operations of a server of a personal computing cloud having, in addition to the server, first and second different client devices, wherein the operations include:
receipt of a request from the first client device of the personal computing cloud to migrate a first session of a first application executing on the first client device off the first client device; and
in response to receipt of the message, transmission of a message to the second client device of the personal computing cloud equipped to launch a second application on the second client device, to success the first application, to migrate the first session of the first application onto a second session of the second application on the second client device, wherein the message includes information for the migration, wherein the first and second applications are different applications.

17. The storage medium of claim 16, wherein transmission of a message comprises transmission of a message that includes metadata of the first application of the first client device, first actions supported by the first application of the first client device, first data formats supported by the first application of the first client device, a first locator identifying resources used by the first application of the first client device, or one or more parameter values of a first state of the first session of the first application.

18. The storage medium of claim 16, wherein the operations further comprise determination of supports of the second client device as including supports for the first actions and the first data formats.

19. The storage medium of claim 16, wherein the operations further comprise registration of the second application of the second client device, including registration of metadata of the second application, second actions supported by the second application, or second data formats supported by the second application.

20. The storage medium of claim 16, wherein the operations further comprise registration of the client device.

21. A server for personal cloud computing, comprising
a networking interface configured to couple the server to a network;
a processor coupled to the networking interface, and configured to execute instructions;
storage medium coupled to the processor, and having stored therein programming instructions configured to program the server, to cause the server, in response to execution of the instructions by the server, to operate in a personal computing cloud, to
receive a request from a first client device of the personal computing cloud to migrate a first session of a first application executing on the first client device off the first client device; and
in response to receipt of the message, send a message to a second client device of the personal computing cloud equipped to launch a second application on the second client device, to succeed the first application, to migrate the first session of the application onto a second session of the second application on the other client device, wherein the message includes information for the migration, the first and second client devices are different client devices, and the first and second applications are different applications.

22. The server of claim 21, wherein to send a message comprises to send a message that includes metadata of the first application of the first client device, first actions supported by the first application of the first client device, first data formats supported by the first application of the first client device, a first locator identifying first resources used by the first application of the first client device, or first one or more parameter values of a first state of the first session of the first application on the first client device.

23. The server of claim 21, wherein the programming instructions further cause the apparatus to determine the second client device as in support of second actions and data formats that respectively include the first actions and the first data formats.

24. The server of claim 21, wherein the programming instructions further cause the apparatus to register the application of the second client device, including registration of second metadata of the second application being registered, second actions supported by the second application, or second data formats supported by the second application.

25. The server of claim 21, wherein the programming instructions further cause the apparatus to register the second client device.

* * * * *

UNITED STATES PATENT AND TRADEMARK OFFICE
CERTIFICATE OF CORRECTION

| | |
|---|---|
| PATENT NO. | : 8,843,616 B2 |
| APPLICATION NO. | : 12/879816 |
| DATED | : September 23, 2014 |
| INVENTOR(S) | : Ochoa et al. |

It is certified that error appears in the above-identified patent and that said Letters Patent is hereby corrected as shown below:

In the Claims

Column 8
Line 16, "...personal computing," should read - ...personal computing cloud, Signed and Sealed this
Fifth Day of May, 2015

Michelle K. Lee
*Director of the United States Patent and Trademark Office*